Patented Nov. 3, 1942

2,300,976

UNITED STATES PATENT OFFICE 2,300,976

PREPARATION OF METHYLOL COMPOUNDS OF UREA OR THIOUREA STABLE IN STORAGE

Hans Scheuermann, Ludwigshafen - on - the - Rhine, Germany; vested in the Alien Property Custodian No Drawing. Application June 22, 1939, Serial No. 280,570. In Germany July 12, 1938

4 Claims. (Cl. 260—15)

The present invention relates to improvements in the preparation of methylol compounds of urea or thiourea which are stable in storage.

Solutions of methylol compounds of urea or thiourea or both, such as are obtained for example by dissolving urea or thiourea or both, for example at 45° C. and at a pH value of 8.0 in from 30 to 40 per cent aqueous formaldehyde, do not have unlimited stability. On the contrary there separate therefrom upon cooling, after a shorter or longer time, solid compounds so that the solutions solidify to a pulp. If the solutions be stirred during the separation of the solid compounds, a salve-like paste is obtained. This paste has a somewhat better stability in storage and may be kept for example for some weeks. After this time, however, it can no longer be used, but solidifies to a more or less solid cake. This cake, even when it is finely divided, can no longer be satisfactorily brought into solution.

I have now found that dispersions, that is solutions or suspensions of the said methylol compounds can be rendered of very good stability in storage by adding thereto a watersoluble practically neutral highly polymeric thickening agent. for this purpose all inert substances, i. e. substances which do not combine or react with the methylol compounds to form insoluble compounds as for example casein or albumens do are suitable. For example there may be mentioned watersoluble cellulose esters or ethers, and also cellulose ether derivatives containing carboxyl groups, which are obtainable by etherifying cellulose with hydroxycarboxylic acids, and their salts, and watersoluble polyvinyl compounds, such as polymethyl-vinyl ether or alkali salts of polyacrylic acids. Watersoluble derivatives of partially degraded cellulose, as for example hydroxycellulose glycollic acid, are also suitable. Generally speaking, the desired action is obtained by the addition of from about ½ to about 5 per cent of the said thickening agents, but smaller or larger amounts can also be employed. The capacity of the pastes for being stored is excellent. The particles do not conglomerate and the products will dissolve in warm water even after several months.

The following examples will further illustrate how this invention may be carried out in practice but the invention is not restricted to these examples. The parts are by weight.

Example 1

1050 parts of urea are dissolved in 3500 parts of 30 per cent aqueous formaldehyde solution at 45° C. and a pH value of 8.2. After half an hour there are added, also at 45° C., 84 parts of a hydroxycellulose glycollic acid ether and the mixture is allowed to become cold while stirring. The paste thus obtained may if desired be passed through a colloid mill or a color mill to produce a fine dispersion. After storage for six months, it will still dissolve in warm water to give a clear solution.

Example 2

600 parts of urea and 380 parts of thiourea are added at 45° C. and at a pH value of 8.2 to a solution of 144 parts of a 25 per cent solution of polymethacrylic acid sodium salt in 3000 parts of 30 per cent aqueous formaldehyde solution. After half an hour, the solution is allowed to become cold while stirring well. A paste is obtained which can be stored very well. Even after storage for several months it still dissolves readily in warm water and may be used for example for improving fibrous materials.

What I claim is:

1. As a composition of matter a pasty mass of methylol compounds of a substance selected from the class consisting of urea and thiourea, said methylol compound being obtained by the method consisting in dissolving said substance in aqueous formaldehyde of from 30 to 40% at a temperature of about 45° C. and a pH of about 8, a water-soluble practically neutral colloidal substance inert against said methylol compounds in an amount sufficient to thicken the pasty mass and water in an amount insufficient to dissolve both said methylol compounds and said colloidal substance together.

2. The composition as defined in claim 1, wherein said water-soluble practically neutral colloidal substance is polymethacrylic acid sodium salt.

3. The composition as defined in claim 1, wherein said water-soluble practically neutral colloidal substance is a water-soluble cellulose ether.

4. The composition as defined in claim 1, wherein said water-soluble practically neutral colloidal substance is hydroxy-cellulose glycolic acid ether.

HANS SCHEUERMANN.